Figure 12:
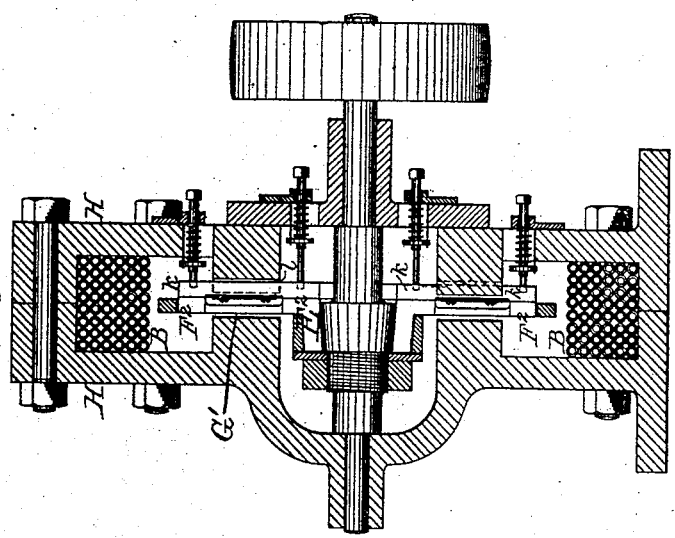

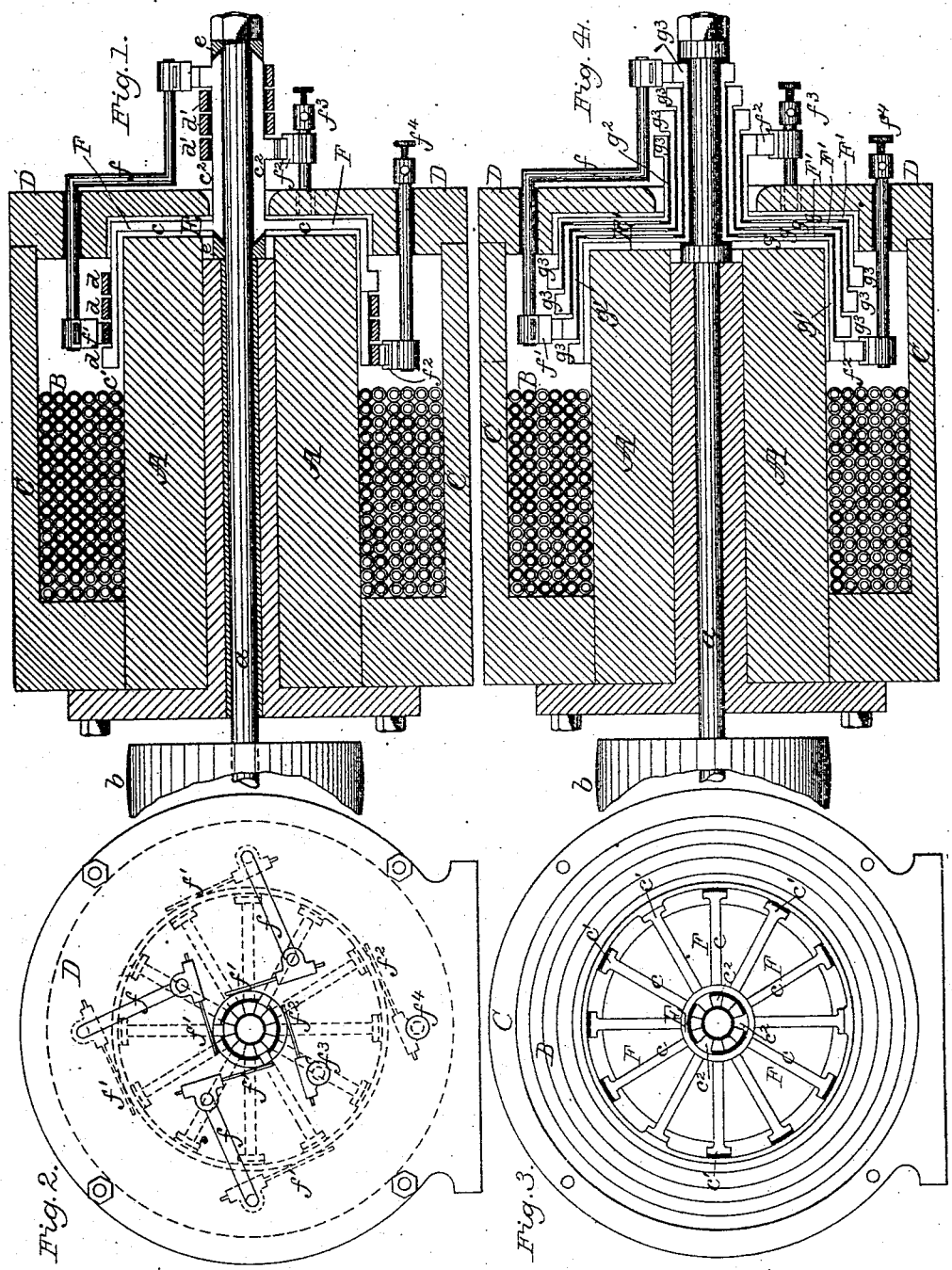

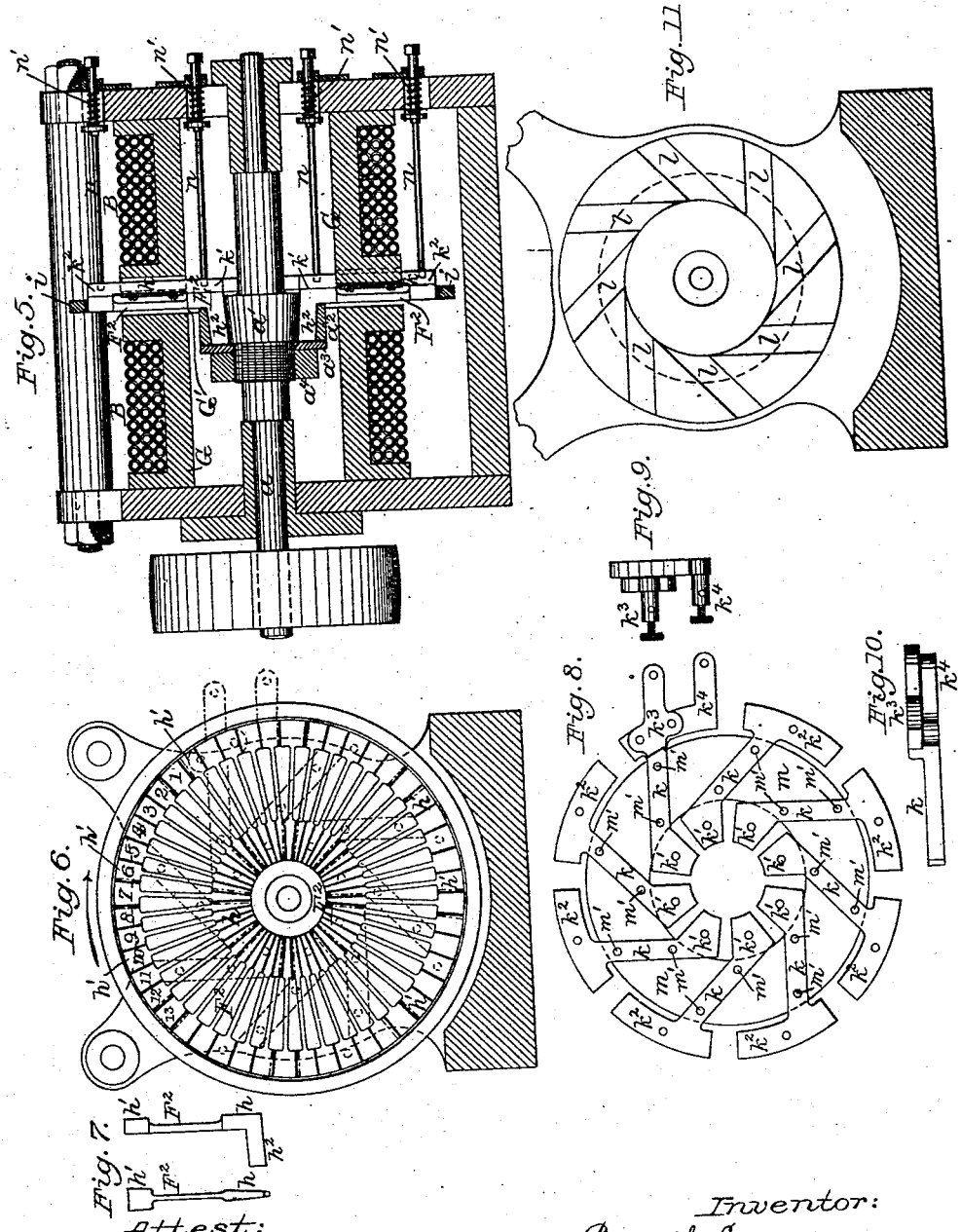

(No Model.)

BEST AVAILABLE COP'

R. EICKEMEYER.
UNIPOLAR DYNAMO ELECTRIC MACHINERY.

No. 396,149.  Patented Jan. 15, 1889.

3 Sheets—Sheet 3.

Attest:
Philip F. Larner
Lowell Bartle

Inventor:
Rudolf Eickemeyer
By
Attorney

UNITED STATES PATENT OFFICE.

RUDOLF EICKEMEYER, OF YONKERS, NEW YORK.

UNIPOLAR DYNAMO-ELECTRIC MACHINERY.

SPECIFICATION forming part of Letters Patent No. 396,149, dated January 15, 1889.

Application filed May 22, 1886. Serial No. 202,973. (No model.)

*To all whom it may concern:*

Be it known that I, RUDOLF EICKEMEYER, of Yonkers, in the county of Westchester and State of New York, have invented certain new and useful Improvements in Magneto-Electric and Electro-Magnetic Machines; and I do hereby declare that the following specification, taken in connection with the drawings furnished and forming a part of the same, is a clear, true, and complete description of the several features of my invention.

These improvements relate to what are known as "unipolar" machines, and to that particular class thereof which were disclosed by me in my application for Letters Patent filed November 8, 1882, Serial No. 76,234, and which embody a series of internal or armature conductors connected in linear circuit or series by a series of outside conductors, said internal conductors being exposed to a magnetic field and conducting electricity always in one direction, and said outside conductors serving to couple said internal conductors in linear circuit in one or more series. In my said application, Serial No. 76,234, various forms of machines devised by me were illustrated, and in some of them—as, for instance, one of the forms illustrated in a division of said application, filed May 14, 1883, Serial No. 94,900, and also in another division application, filed May 7, 1885, Serial No. 158,033—the armatures were provided with conductors, which in part occupied lines radial to the axis of the armature, and my present application relates to machines having armatures provided with radial conductors, whether the same be restricted to radial lines, or, in addition thereto, also occupy lines parallel with the axis of the armature and at right angles to said radial lines. In connection with an armature embodying these radial conductors I employ coincident magnetic pole-faces which are rectangular to the axis of the armature and afford a circular magnetic field, within and through which the radial conductors travel, and such pole-faces were illustrated by me in my aforesaid application, Serial No. 76,234, and the several forms of machine hereinafter described operate upon the principle illustrated in Figure 5 of the drawings filed with said application.

After fully describing the several machines illustrated in the drawings, the novel features which are to constitute the subject of this application will be specified in the several clauses of claim hereunto annexed.

Figure 13:
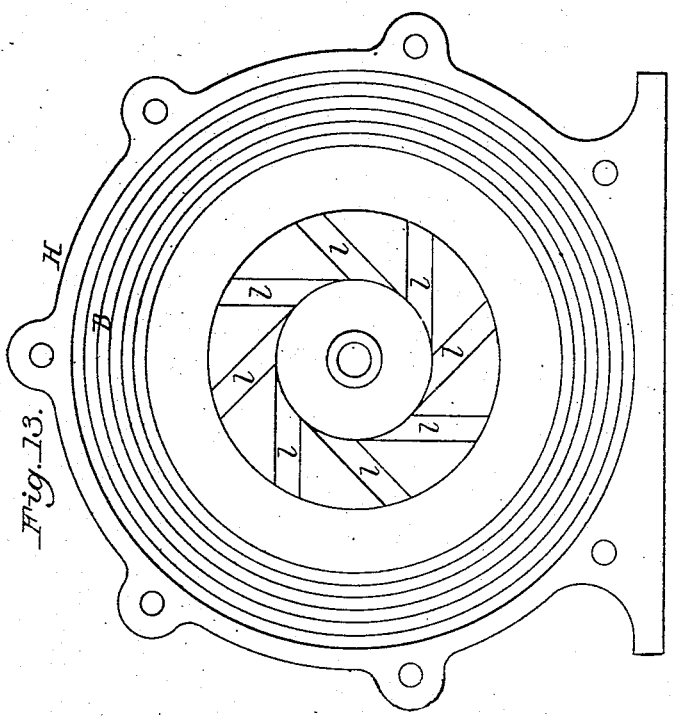

Referring to the three sheets of drawings, Fig. 1 illustrates in longitudinal lateral section one of my machines, embodying an armature provided with a series of independent internal bar conductors, which occupy lines radial to and also parallel with the axis of the armature, and outside conductors by which said internal radial conductors are connected in circuit. Fig. 2 is an end view of the machine, Fig. 1, with the nut and cap at the end of the armature-shaft removed for better disclosing the adjacent ends of the internal conductors. Fig. 3 is a similar end view, but with the outside conductors and also the outer pole of the magnet removed. Fig. 4, in a sectional view like Fig. 1, illustrates a machine having a similar magnet and outside conductors; but the internal conductors are in the form of disks having tubular extensions for affording electric connection with the outside conductors. Fig. 5, in longitudinal vertical section, illustrates one of my machines in which the internal conductors of the armature are restricted to lines radial to the axis of the armature. Fig. 6 illustrates the interior of the machine, the bed-plate being in section and the end portion of the machine, with the outside stationary conductors, removed. Fig. 7 illustrates in front and side view a detached armature-conductor. Fig. 8 illustrates the several stationary conductors detached from the machine. Figs. 9 and 10 illustrate the stationary or outside conductors which serve as the terminals of the machine. Fig. 11 illustrates that portion of the machine, Fig. 5, in which the stationary or outside conductors are mounted. Fig. 12, in central vertical longitudinal section, illustrates one of my machines in which the armature-conductors are restricted to radial lines, and in which the armature itself is encircled by the exciting-helix housed within the shell which affords the coincident pole-faces. Fig. 13 illustrates one-half of the magnetic shell of the machine, Fig. 12.

In the machine shown in Figs. 1, 2, and 3 the magnetic system includes a central cylindrical stationary core, A, an encircling exciting-helix, B, an inclosing-shell, C, which serves as a frame for the machine, and an end plate, D, these parts being as shown and developing a pole-face at one end of the core A, a coincident pole-face at the end plate, D, and an annular magnetic field between said faces. The center of the stationary core A is provided with a tubular bearing for the axis $a$ of the armature E, said axis or shaft having at one end a belt-pulley, $b$.

The armature-conductors F are in the form of bars which occupy radial lines, as at $c$, and at $c'$ they occupy lines parallel with the axis $a$, and at their outer ends they extend along and parallel with said axis, as at $c^2$. The number of these bar-conductors F may be almost indefinitely varied; but, as here shown, there are twelve of them, although these are so coupled together as to constitute four sets, each set including three conductors, as will be readily seen in Figs. 1 and 3. Said conductors are thus united in sets by means of conducting-rings $d\ d'$. These conducting-bars and their rings are best mounted upon said axis by means of a pair of concave annular insulating-blocks, $e$, and a clamping-nut, $e'$, at the outer end of the axis, the ends of the portions $c^2$ of each bar being inclined, so as to fit the concavities of said insulating-blocks and enabling them to be firmly clamped in position. Each set of conducting-bars has an inner conducting-ring, $d$, and an outer conducting-ring, $d'$, and these rings are coupled in circuit by outside conductors, $f$, provided with brushes $f'$ at each end for respectively engaging in contact with one of the inner rings, $d$, and some one of the outer rings, $d'$, so that a continuous or linear electric circuit is afforded through all of the three sets of bars and their rings, and through the outside conductors, one of the outer rings and one of the inner rings being coupled by brushes $f^2$ to screw-posts $f^3\ f^4$ to afford terminals for the machine. As thus organized, whether the armature be revolved as in a generator or as in a motor, electric currents will traverse all the armature-conductors in one direction and traverse the outside conductors in the opposite direction, because the rings of each set of armature-conductors are appropriately connected electrically with the proper rings of other sets, thus affording a continuous electric circuit from either screw-post through the several sets of conductors to the other screw-post.

It will be obvious that the radial portions of the armature-conductors occupy the most effective portion of the magnetic field; but it will also be seen that the other portions of said conductors also occupy outlying portions of said field. This novel embodiment in a machine of an armature having a set of independent radial conductors and a single helix housed within the shell of a magnet, affording coincident faces of opposite polarity, and an annular magnetic field at right angles to the axis of the armature for the reception of the radial conductors, enables the production of effective machines in compact form and at low cost.

The grouping of two or more radial armature-conductors and placing them in communication with a pair of conducting-rings, as shown in this machine, is also a novel feature, and is conducive to highly-effective results. Instead of grouping three of said bars to each pair of conducting-rings, it is obvious that two or four or any greater number may be thus grouped, according to the number of separate circuits required, or according to the number of bars which it may be desirable to embrace in a single circuit throughout its path. It is equally novel with me to provide each radial conductor with a conducting-ring for affording electric communication with other armature-conductors by the way of stationary conductors.

In Fig. 4 the central core, A, helix B, inclosing-shell C, end plate, D, outside conductors, $f$, brushes $f'$, screw-posts $f^3\ f^4$, and brushes $f^2$ are all substantially as previously described. The armature E' differs from that shown in Fig. 1 mainly in the form and character of the armature-conductors F', which in this case are in the form of disks $g$, each having a large tubular projection, as at $g'$, and a smaller tubular projection, as at $g^2$, and at the end of each projection there is a conducting-ring, $g^3$, with which the brushes engage. In the machine shown in Fig. 1 the several armature-conductors occupy one plane, but with the disk-conductors each occupies a separate plane, and hence the magnetic field or space between the pole-faces in Fig. 4 is wider than that in Fig. 1. The several disk-conductors and their tubular projections are of course insulated from each other and from the armature-axis, and their grouping, as shown, necessarily unites them in mass, so that as a complete set of conductors they can be integrally applied to and removed from the armature-axis and be readily insulated therefrom and clamped thereto—as, for instance, between a collar on the axis and a collar and nut at the outer end thereof, as shown.

It will of course be understood that the disk-conductors have little, if any, more effective capacity than any one of the single radial conducting-bars F of the machine, Fig. 1, and hence bars will generally be preferred, and if not preferred for that reason alone it should be observed that the bars admit of placing the pole-faces in closer proximity to each other, and enable a highly-effective magnetic field to be afforded with comparatively little bulk of metal and a comparatively small exciting-helix.

The machine shown in Figs. 5 to 11, inclusive, differs largely in form and construction from either of those previously described, but it embodies similar features. The framing of this form of machine may or may not constitute a part of the magnetic system without departure from my invention, and for the purposes of this specification said system may be limited to the two tubular magnets G and their exciting-helices B, said magnets being placed end to end to afford an annular magnetic field at G' between their ends, which constitute annular coincident pole-faces, which are of course oppositely polarized. The armature $E^2$ differs from those previously described mainly in that its bar-conductors $F^2$ are restricted to radial lines, and as a result thereof they are differently mounted upon the armature-axis $a$, and involve the use of outside stationary conductors of a somewhat different form and character.

As here shown in Fig. 6, there are forty-eight radial bar-conductors $F^2$, occupying a plane common to all. Each conductor is wedge-shaped, and at its inner end it has a narrow long contact-face, as at $h$, and at its outer end a shorter but wider contact-face, $h'$, and between these inner and outer faces they are reduced in size both at the front and at their sides, thus affording open spaces between them and an annular recess in front. Each conductor at its inner end has an inclined tail-piece, $h^2$, so that when annularly arranged around a frusto-conical hub, $a'$, on the axis $a$, they can be firmly clamped thereon by means of the sleeve $a^2$, washer $a^3$, and nut $a^4$, which is tapped upon a threaded portion of the axis or shaft $a$. The outer ends of the conductors are firmly clamped by means of a binding-ring, $i$, which can be solid and frictionally applied in small machines or made in segmental sections and united by adjustable clamping-screws in larger machines.

It is of course to be understood that the several radial bar-conductors are insulated from each other and from the clamping devices and that their contact-faces should be trued up, so as to afford annular contact-surfaces broken only by the insulated spaces intervening between the faces. This skeletonizing of the armature at that portion thereof which is composed wholly of conducting-bars, coupled with the arrangement of the magnet by which circulating-drafts of air must be freely developed by the rotating armature, is obviously conducive to the elimination of such heat as may be developed as a result of the movements of the armature-conductors in the magnetic field. These forty-eight radial conductors are organized so as to co-operate with eight stationary conductors, $k$, each of the latter (except the terminals) having a capacity to simultaneously engage with five of the conductors at their inner contact-faces, and also with five other conductors at their outer contact-faces. Although these particular conductors $k$ are practically housed within the machine, I term them "outside" conductors, in that they are outside of the armature, but co-operate with the conducting-bars thereon for placing them in linear circuit, and I have also called them "stationary" conductors, although in each case they are in whole or in part capable of more or less independent movement; but they are always stationary with respect to the moving contact-faces on the rotating armature. At regular intervals between each two successive stationary conductors one of said armature-conductors is wholly out of circuit, said interval varying of course according to the speed at which the armature may be rotated. The two stationary conductors, which serve as the terminals, also respectively engage successively with five inner and five outer faces of the armature-conductors. This novel feature of alternately grouping and electrically connecting several bar-conductors of a series with one of several outside or stationary conductors resembles a feature which was disclosed by me in my application for Letters Patent, Serial No. 76,234, and also in a division thereof filed March 7, 1885, Serial No. 158,033, although therein the contacts were arranged to provide for a circuit through the armature-conductors which alternately included one and more than one of the said conductors throughout the path of the armature portion of the circuit.

In one of the pole-faces opposite the contact-faces of the armature-conductors there is a series of tangential slots, $l$, as is clearly shown in Fig. 11, and in each slot one of the stationary or outside conductors $k$ is loosely located. All of said conductors are properly insulated against contact with said pole-face and from each other, and they are maintained in proper relative positions by means of an annular plate, $m$, composed of flexible insulating-material, and loose dowel-pins or screws $m'$, as clearly shown in Figs. 5 and 8.

Each stationary conductor has an inner contact-face, $k'$, and an outer contact-face, $k^2$, occupying such positions with relation to each other that when in position, the two faces on any one stationary conductor cannot possibly engage with the two faces of any one armature-conductor, as is clearly indicated in Fig. 6, wherein it will be assumed that the armature is to revolve in the direction of the arrow. The stationary conductors are shown in dotted lines. Commencing with the armature-bar No. 1, which is out of circuit, Nos. 2, 3, 4, 5, and 6 will be coupled by way of their outer contacts with bars 8, 9, 10, 11, and 12, bars 7 and 13 being also out of circuit, and so on, every sixth bar being successively neutral or out of circuit and each group of five bars being successively in circuit, thus providing for a continuous circuit through the machine, and always including five bars in the path of said circuit.

Although the central portions of the radial armature-conductors need only be insulated by free open spaces, it will be seen that there will be little or no liability of short-circuiting, because between any two groups of bars included in the linear circuit there will always be an intermediate idle or neutral bar, and also the two intervening free spaces, and as the bars pass to and from each contact-face of an outside conductor there is of course a more or less incomplete contact; but at all times four bars will be fully grouped in the circuit alternating with a complete contact of five bars.

The terminals of this machine are provided by separating the outer end of one of the stationary conductors into two parts and insulating them from each other, as is clearly shown in Figs. 8, 9, and 10, one terminal, $k^3$, extending to the inner contact-faces of the armature-conductors, and the other terminal, $k^4$, engaging with the outer contact-faces.

Each stationary conductor is provided near its ends with controlling-rods $n$ and adjustable expansive spiral springs $n'$, by which desirable electric contacts are maintained between the stationary conductors and the contact-faces on the radial armature-conductors.

In Figs. 12 and 13 I show the same form of armature $E^2$ last described and the same arrangement of stationary conductors; but the magnetic system includes the two shells H bolted together, affording coincident annular pole-faces, and the intervening magnetic field $G'$. The armature-conductors $F^2$ and the stationary conductors $k$, occupying tangential slots $l$ in one of said pole-faces, are all as shown in Fig. 13.

In this machine the helix B is housed within the magnetic shell, as shown in Fig. 1, and also as disclosed in my aforesaid original application, as well as in certain divisions thereof; but there are certain novel features in this machine, as well as in the machine shown in Fig. 5, which will be hereafter made the subjects of separate applications for Letters Patent, said features consisting of the peculiarly formed and arranged radial bars, the tangential arrangement of the outside conductors, and the longitudinally - actuated spring-contacts, as well as combinations specifically including said novelties.

I have shown stationary conductors provided with spring contacts or brushes, and others having contact-faces composed of non-flexible or rigid material backed by springs; but I do not restrict myself to contacts of any specific variety. In my prior applications for Letters Patent I have disclosed many novel features for securing desirable contact between movable conductors, and also between movable and stationary conductors, and many of these may be employed to advantage in these machines. The stationary conductors shown in Fig. 8, if composed of soft sheet metal, may be struck up in dies and provided with recesses or pockets for the reception of contact-blocks composed of carbon or other suitable conducting material possessing insufficient strength to warrant its use for forming the entire conductor, and highly-satisfactory results will accrue from the use of contact-blocks composed of cellular or porous carbon charged or filled with mercury or with mercury amalgam.

In some of my prior unipolar machines I have employed armature - conductors composed of magnetic metal, and such may be employed in these machines without in any manner departing from my invention, and the same is true as to the armature-axis, which may or may not constitute a portion of the magnetic system. Each of these forms of machine contains a pair of oppositely-polarized coincident pole-faces affording a circular magnetic field, and in each the armature embodies an axis located centrally with relation to said pole-pieces, and also a conductor radial to said axis and located in said magnetic field, and it is to be understood that this feature of my invention will in part constitute the subject of a separate application for Letters Patent. (See Serial No. 203,125.)

Having thus described my invention, I herein claim as new and desire to secure by Letters Patent—

1. In an electro-magnetic or magneto-electric machine, the combination, substantially as hereinbefore described, of a rotating armature provided with a series of independent radial bar-conductors, and outside conductors which couple the outer and the inner ends of the armature bar-conductors and couple said conductors in linear circuit.

2. In an electro-magnetic or magneto-electric machine, the combination, substantially as hereinbefore described, of a rotating armature carrying a series of radial bar-conductors coupled in linear circuit by outside conductors, a magnetic shell affording annular coincident faces at right angles to the axis of the armature, and an exciting-helix housed within said shell for developing in said faces opposite polarity and affording between them an annular magnetic field for the reception of said radial armature bar-conductors.

3. In an electro-magnetic or magneto-electric machine, the combination, substantially as hereinbefore described, of a rotating armature provided with a series of radial conductors and outside conductors which couple the outer ends of two or more of said armature-conductors with the inner ends of two or more other armature-conductors, and thus provide on said armature a linear electric circuit which at all points in its path includes two or more of said radial conductors.

4. In an electro-magnetic or magneto-electric machine, the combination, substantially as hereinbefore described, of an armature provided with a series of independent radial conductors and outside conductors, each in electric communication with four or more of said armature-conductors, and coupling said armature-conductors in a linear circuit which embraces in its path at all points two or more of said armature-conductors.

5. In an electro-magnetic or magneto-electric machine, the combination, substantially as hereinbefore described, of an armature provided with a series of independent radial conductors and a series of conducting-rings coupled in pairs to two or more of said armature-conductors, and a series of outside conductors communicating with said rings and affording a continuous circuit which embraces at all points in its path two or more of said radial conductors.

RUDOLF EICKEMEYER.

Witnesses:
R. EICKEMEYER, Jr.,
CORNELIUS W. RYER.